United States Patent
Park

(10) Patent No.: US 7,413,697 B2
(45) Date of Patent: Aug. 19, 2008

(54) PRE-MOLDING HEAT TREATMENT OF DYNAMIC VULCANIZATES OF FLUOROCARBON ELASTOMERS

(75) Inventor: Edward Hosung Park, Saline, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 214 days.

(21) Appl. No.: 10/873,084

(22) Filed: Jun. 21, 2004

(65) Prior Publication Data

US 2005/0281973 A1    Dec. 22, 2005

(51) Int. Cl.
- C08J 5/00    (2006.01)
- C08L 27/12   (2006.01)
- C08L 27/18   (2006.01)
- C08L 27/20   (2006.01)

(52) U.S. Cl. .................. 264/331.13; 264/331.14; 264/331.22; 525/199

(58) Field of Classification Search ............ 264/331.13, 264/331.14, 331.22; 525/199
See application file for complete search history.

(56) References Cited

U.S. PATENT DOCUMENTS

| | | | |
|---|---|---|---|
| 2,476,884 A | 7/1949 | Maynard | |
| 3,037,954 A | 6/1962 | Gessler et al. | |
| 3,538,028 A | 11/1970 | Morgan | |
| 3,580,889 A | 5/1971 | Barney et al. | |
| 3,787,341 A | 1/1974 | Aron | |
| 3,853,811 A | 12/1974 | Chandrasekaran | |
| 3,884,877 A | 5/1975 | Kolb | |
| 4,035,565 A | 7/1977 | Apotheker et al. | |
| 4,094,949 A | 6/1978 | Yokokawa et al. | |
| 4,287,320 A | 9/1981 | Kolb | |
| 4,311,628 A | 1/1982 | Abdou-Sabet et al. | |

(Continued)

FOREIGN PATENT DOCUMENTS

CA      2475263      9/2003

(Continued)

OTHER PUBLICATIONS

Schmiegel, Walter W., "A Review of Recent Progress in the Design and Reactions of Base-Resistant Fluoroelastomers.", IRC, Jul. 2003.

(Continued)

*Primary Examiner*—Susan W Berman
(74) *Attorney, Agent, or Firm*—Ronald W. Wangerow; Harness, Dickey & Pierce, P.L.C.

(57) ABSTRACT

Methods for making processable rubber compositions containing fluorocarbon elastomers cured by polyol or phenol curative agents include an optional heat treating step before thermoplastic processing. In one aspect, a dynamic vulcanizate of a fluorocarbon elastomer containing an excess of un-reacted polyol curative agent is subject to a pre-molding heat treatment at a temperature of 150° C. or above, but preferably below the thermoplastic processing temperature, for a time sufficient to drive off or decompose at least part of the un-reacted or excess polyol curative agent. After part or all of the curative agent is driven off or decomposed by the heat treatment, the heat treated material may be thereafter processed by thermoplastic techniques to form shaped articles. Advantageously, articles produced by thermoplastic processing of the heat treated dynamic vulcanizates are characterized by a low permeability to gases and vapors.

23 Claims, 1 Drawing Sheet

U.S. PATENT DOCUMENTS

| | | |
|---|---|---|
| 4,328,140 A | 5/1982 | Singletary et al. |
| 4,419,499 A | 12/1983 | Coran et al. |
| 4,450,263 A | 5/1984 | West |
| 4,451,542 A | 5/1984 | Ishida et al. |
| 4,491,536 A | 1/1985 | Tomoda |
| 4,530,881 A | 7/1985 | Santoso et al. |
| 4,572,516 A | 2/1986 | Symons et al. |
| 4,624,978 A | 11/1986 | Frayer |
| 4,656,228 A | 4/1987 | Richter et al. |
| 4,696,976 A | 9/1987 | Ellerbe, III et al. |
| 4,696,989 A | 9/1987 | Oka et al. |
| 4,696,998 A | 9/1987 | Brunelle et al. |
| 4,713,418 A | 12/1987 | Logothetis et al. |
| 4,787,991 A | 11/1988 | Morozumi et al. |
| 5,006,594 A * | 4/1991 | Rees ..................... 524/520 |
| 5,095,072 A | 3/1992 | Kobayashi et al. |
| 5,108,780 A | 4/1992 | Pitt et al. |
| 5,206,293 A | 4/1993 | Sakai et al. |
| 5,219,931 A | 6/1993 | Siol et al. |
| 5,331,040 A | 7/1994 | Lee |
| 5,354,811 A | 10/1994 | Kamiya et al. |
| 5,371,143 A * | 12/1994 | Novak et al. ................. 525/88 |
| 5,384,374 A | 1/1995 | Guerra et al. |
| 5,397,832 A | 3/1995 | Ellul |
| 5,459,202 A | 10/1995 | Martinez et al. |
| 5,548,028 A | 8/1996 | Tabb |
| 5,585,152 A | 12/1996 | Tamura et al. |
| 5,589,526 A | 12/1996 | Sienel et al. |
| 5,639,810 A | 6/1997 | Smith et al. |
| 5,700,866 A | 12/1997 | Tabb |
| 5,723,544 A | 3/1998 | Lee |
| 5,792,348 A | 8/1998 | Eisinga |
| 5,910,544 A | 6/1999 | Ozawa et al. |
| 5,962,589 A | 10/1999 | Matsumoto et al. |
| 6,048,939 A | 4/2000 | Priester |
| 6,054,537 A | 4/2000 | Shimizu et al. |
| 6,066,697 A | 5/2000 | Coran et al. |
| 6,079,465 A | 6/2000 | Takeyama et al. |
| 6,114,441 A | 9/2000 | Spohn et al. |
| 6,147,158 A | 11/2000 | Chmielewski |
| 6,162,385 A | 12/2000 | Grosse-Puppendahl et al. |
| 6,310,141 B1 | 10/2001 | Chen et al. |
| 6,312,639 B1 | 11/2001 | Ertle et al. |
| 6,407,174 B1 | 6/2002 | Ouhadi |
| 6,410,630 B1 | 6/2002 | Hoover et al. |
| 6,429,249 B1 | 8/2002 | Chen et al. |
| 6,437,030 B1 | 8/2002 | Coran et al. |
| 6,500,374 B1 | 12/2002 | Akioka et al. |
| 6,624,251 B1 | 9/2003 | Chmielewski |
| 6,656,831 B1 | 12/2003 | Lee et al. |
| 6,774,171 B2 | 8/2004 | Kassa et al. |
| 6,872,325 B2 | 3/2005 | Bandyopadhyay et al. |
| 7,022,769 B2 | 4/2006 | Park |
| 7,029,750 B2 | 4/2006 | Takei et al. |
| 7,087,679 B2 | 8/2006 | Shimizu et al. |
| 7,098,270 B2 * | 8/2006 | Hochgesang et al. ........ 525/192 |
| 2002/0091205 A1 | 7/2002 | Brewer et al. |
| 2002/0099142 A1 | 7/2002 | Faulkner |
| 2002/0113066 A1 | 8/2002 | Stark et al. |
| 2002/0122928 A1 | 9/2002 | Botrie et al. |
| 2002/0198320 A1 | 12/2002 | Chmielewski et al. |
| 2003/0026995 A1 | 2/2003 | Duchesne et al. |
| 2003/0082384 A1 | 5/2003 | Mhetar |
| 2003/0138655 A1 | 7/2003 | Watanabe et al. |
| 2003/0166780 A1 | 9/2003 | Shimizu et al. |
| 2004/0183702 A1 | 9/2004 | Nachtigal et al. |
| 2004/0260023 A1 | 12/2004 | Park et al. |
| 2005/0148183 A1 | 7/2005 | Shiro et al. |
| 2005/0155690 A1 | 7/2005 | Park |
| 2005/0165168 A1 | 7/2005 | Park |
| 2005/0167928 A1 | 8/2005 | Park et al. |
| 2005/0171282 A1 | 8/2005 | Park |
| 2005/0222337 A1 | 10/2005 | Park |
| 2005/0272872 A1 | 12/2005 | Park |
| 2005/0275565 A1 | 12/2005 | Nachtigal et al. |
| 2005/0288434 A1 | 12/2005 | Sugiura et al. |
| 2006/0004126 A1 | 1/2006 | Park et al. |
| 2006/0142467 A1 | 6/2006 | Park |
| 2006/0142491 A1 | 6/2006 | Park |
| 2006/0142492 A1 | 6/2006 | Park |
| 2006/0148954 A1 | 7/2006 | Park et al. |
| 2007/0004862 A1 | 1/2007 | Park et al. |
| 2007/0044906 A1 | 3/2007 | Park |
| 2007/0055020 A1 | 3/2007 | Park |

FOREIGN PATENT DOCUMENTS

| | | |
|---|---|---|
| CA | 2513789 | 8/2004 |
| EP | 0132583 | 2/1985 |
| EP | 0148719 | 7/1985 |
| EP | 0239707 | 10/1987 |
| EP | 0 168 020 B1 | 10/1989 |
| EP | 0422960 | 4/1991 |
| EP | 0432911 | 6/1991 |
| EP | 0439734 | 8/1991 |
| EP | 0254307 | 12/1991 |
| EP | 0304843 | 3/1993 |
| EP | 0566313 | 10/1993 |
| EP | 0681113 | 11/1995 |
| EP | 0714944 | 6/1996 |
| EP | 1209203 | 5/2002 |
| JP | 58-032655 | 2/1983 |
| JP | 62-011767 | 1/1987 |
| JP | 62-236841 | 10/1987 |
| JP | 05-156090 | 6/1993 |
| JP | 05-186606 | 7/1993 |
| JP | 06-016949 | 1/1994 |
| JP | 11-140269 | 5/1999 |
| JP | 2000-079928 | 3/2000 |
| JP | 2001-336679 | 12/2001 |
| WO | WO 96/00761 | 1/1996 |
| WO | WO 00/11073 | 3/2000 |
| WO | WO 01/48077 | 7/2001 |
| WO | WO 01/98405 | 12/2001 |

OTHER PUBLICATIONS

"AFLAS™ The Fluoroelastomer", Asahi Glass Company, Product Information, pp. 1-8, Apr. 11, 2003.

"Fluorine-Containing Polymers", Encyclopedia of Polymer Science & Engineering, vol. 7, 1987, Second Edition, pp. 256-267.

"Viton® Fluoroelasotmer, A Product of Dupont Dow Elastomers", Technical Information, DuPont Dow Elastomers, Copyright 1988.

Web page, Tetrafluoroethylene-Propylene Rubber, pp. 1-3, unknown date.

Michael J. Moore, "Silanes as Rubber-to-Metal Bonding Agents", 160th Meeting of the Rubber Division, American Chemical Society, Cleveland Ohio, Paper No. 105, pp. 1-17.

"Polyurethanes" Encyclopedia of Polymer Science & Engineering, vol. 13, Second Edition (Date Unknown). (pp. 274-278).

Webpage: "Dyneon™ Fluorothermoplastics" Accessed from 3M Manufacturing and Industrial and Downloaded May 8, 2003. (2 pages).

Viton® Fluoroelastomer: Viton Extreme ETP-600S Technical Information (Formerly designated VTR-8710), DuPont Dow Elastomers (Date Unknown). (6 pages).

Material Safety Data Sheet "DuPont™ TPV 60A01 and 80A01", C.S. Wong, (Sep. 18, 2001). (9 pages).

DuPont "Grades for Customer Evaluation"—TPV 60A and TPV 80A. (3 pages).

Kim, K. et al. "Mold Release Additive Effects on Chlorine and Fluorine Rubber Compound" Struktol Company of America Paper No. 7, Presented at IRMC 2004 Meeting. Apr. 27-28, 2004. (18 pages).

Solvay Solexis: "Product Data Sheet: Tecnoflon FPA 1" available at www.solvaysolexis.com. Copyright 2003. (2 pages).

Sasol: Sasol Olefins and Surfactants available at www.sasoltechdata.com. (20 pages).

* cited by examiner

PRE-MOLDING HEAT TREATMENT OF DYNAMIC VULCANIZATES OF FLUOROCARBON ELASTOMERS

INTRODUCTION

The present invention relates to processable fluorocarbon elastomer compositions and articles made from the compositions.

Cured fluorocarbon elastomer compositions have a desirable combination of stability and fluid resistance that makes them useful for applications in challenging environments. For example, they can be used as the basis for elastomeric seal materials where resistance to organic fluids is required. As such they find application in automotive applications as seals, gaskets, hoses and the like.

To protect the environment and improve air quality, suppliers of seal and hose materials strive constantly to provide improved materials. Fuel hoses made from cured fluorocarbon elastomers must be impermeable to gasoline and other fuels during operation to prevent release of the fuel vapors into the environment. In addition, they must maintain a high degree of flexibility and structural integrity when exposed to various chemical compounds associated with the fuel system. The cured elastomer material itself is amorphous and relatively low density, with interconnected voids in its structure. As a result, the material is relatively permeable to gases and vapors and so is not suitable as a hose material by itself. To overcome this drawback, composite hoses are provided containing at least one impermeable layer along with a cured fluorocarbon layer.

Dynamic vulcanizates of fluorocarbon rubbers in a thermoplastic matrix are prepared by curing a fluorocarbon elastomer in the presence of a curative and a thermoplastic material to make a structure characterized as small particles of cured elastomer in a continuous thermoplastic phase. In a variety of applications, polyol or phenol curative agents are preferred.

The presence of unreacted excess curative agent in the dynamic vulcanizates leads to difficulties during the molding or other thermoplastic operations carried out after the curing of the fluorocarbon rubber in the vulcanization process. The high temperatures required to process the compositions lead to volatilization and degradation of un-reacted phenol curative during subsequent molding or extrusion processes. The resulting off-gassing of volatile components leads to porous structures in articles prepared from the vulcanizates, which are unsuitable as low permeability fuel hoses and the like.

The drawback is not seen in conventional fluorocarbon rubbers cured by phenols, because there the cured composition is not further processed into shaped articles, and because any material that volatilizes or off gasses during a high temperature "post cure" treatment does not cause a porous structure or other lack of structural integrity. This is because the rubber matrix, unlike the thermoplastic matrix of the dynamic vulcanizate, is amorphous and crosslinked and so not subject to damage from the escaping volatile component.

It would be desirable to make cured elastomer compositions having the advantageous properties of phenol cured fluorocarbons, yet have suitable gas and vapor permeability properties to be used in hoses and the like.

SUMMARY

Methods are provided for forming shaped articles from processable rubber compositions. The processable rubber compositions contain dynamic vulcanizates of fluorocarbon elastomers in a continuous phase thermoplastic material. Shaped articles such as hoses, gaskets and the like are provided that have favorable elastomeric characteristics. In addition, they are characterized by a low permeability to gases and vapors. A pre-molding heat treatment step is applied, whereby processable rubber compositions resulting from the dynamic vulcanization of a fluorocarbon rubber in the thermoplastic are subject to an elevated temperature before they are melted and processed into the shaped articles by conventional thermoplastic techniques.

The methods are particularly suited to processable rubber compositions containing fluorocarbon elastomers cured by polyol or phenol curative agents. In one aspect, a dynamic vulcanizate of a fluorocarbon elastomer containing an excess of un-reacted polyol curative agent is subject to a pre-molding heat treatment at a temperature of 150° C. or above, but preferably below the thermoplastic processing temperature, for a time sufficient to drive off or decompose at least part of the un-reacted or excess polyol curative agent. After part or all of the curative agent is driven off or decomposed by the heat treatment, the heat treated material may be thereafter processed by thermoplastic techniques to form shaped articles. Advantageously, articles produced by thermoplastic processing of the heat treated dynamic vulcanizates are characterized by a low permeability to gases and vapors, for example fuel vapors.

Dynamic vulcanization is carried out by combining an elastomer composition and a non-curing thermoplastic polymer in the presence of a polyol or phenol curative agent. The curative agent also contains an accelerator. The combination is melt blended, after which the melt blend is heated while applying shear for a time and at a temperature sufficient to at least partially cure the fluorocarbon elastomer. In a preferred embodiment, the resulting dynamic vulcanizate is cooled and converted to a particulate form, for example by extruding a strand and chopping it into pellets, or casting the material and grinding it. Thereafter, the particulate dynamic vulcanizate is heat treated by exposing it to a temperature, preferably 150° C. or greater, for a time sufficient to remove at least some of the excess un-reacted polyol or phenol curative remaining in the dynamic vulcanizate after the heating and shearing step described above. After the heat treatment step, the heat treated dynamic vulcanizate is heated above its processing temperature and processed according to thermoplastic techniques to make shaped articles of the invention.

Recognizing the need to eliminate or minimize the amount of excess or un-reacted phenol or polyol curative agent in dynamic vulcanizates of this kind, the invention encompasses methods for dynamically vulcanizing fluorocarbon elastomers by techniques that result in processable rubber compositions having lesser amounts of un-reacted polyol curing agents. To the extent that dynamic vulcanizates may be prepared containing a minimum of excess curing agent, the heat treating step may be carried out for a shorter period of time. In the limit that the dynamic vulcanizates are well cured with a minimum of excess curing agent, the separate heat treating step may be done away with. In this embodiment, sufficient heat treatment is provided by the dynamic vulcanization step itself, and by the heating of the dynamic vulcanizate after cooling to provide further processing by thermoplastic techniques. In these embodiments, fluorocarbon elastomer compositions are used that contain a fluorocarbon elastomer, a phenol curative agent, and an accelerator, wherein the curative agent is present at a stoichiometric amount such that after cure the dynamic vulcanizate contains less than about 0.5 phr un-reacted phenol curing agent and wherein the phenol and the accelerator are finely dispersed in the elastomer composition to provide sufficient reaction kinetics to complete the initial cure of the fluorocarbon in less than 15 minutes at 180° C., and to develop full cure density within two hours of pre-molding heat treatment at 200° C. or less.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION

Figure 1:
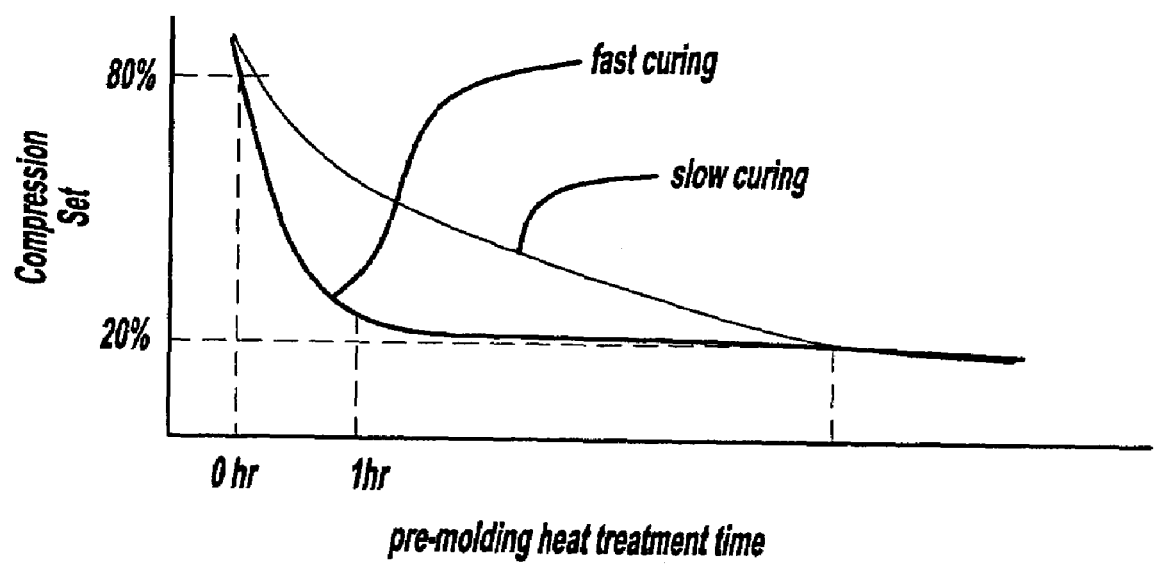
FIG. 1 is a graphical representation of the development of some physical properties during pre-molding heat treatment according to the invention.

The following description of the preferred embodiment(s) is merely exemplary in nature and is in no way intended to limit the invention, its application, or uses.

The headings (such as "Introduction" and "Summary,") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features. Specific Examples are provided for illustrative purposes of how to make, use and practice the compositions and methods of this invention and, unless explicitly stated otherwise, are not intended to be a representation that given embodiments of this invention have, or have not, been made or tested.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

The terms "elastomeric material", "elastomer", and the like refer to chemical compositions that possess, or can be modified (i.e. cured or crosslinked) to possess elastomeric properties. According to context, the terms refer to an uncured or partially cured material, in which elastomeric properties are not fully developed, or to a cured rubber-like material, with fully developed elastomeric properties. At some points in the specification, the terms are used with adjectives such as "cured", "partially cured", or "uncured" for clarity.

In one embodiment, the invention provides a method for processing a rubber composition comprising cured fluorocarbon elastomer, thermoplastic polymer material, and excess un-reacted polyol curative agent into shaped articles. The rubber composition is prepared by a process of dynamically vulcanizing a fluorocarbon elastomer in the presence of a thermoplastic material and a polyol curative agent. The method for processing the rubber composition comprises heat treating the rubber composition at about 150° C. or greater, but preferably below the thermoplastic processing temperature, for a time sufficient to drive off or decompose at least part of the un-reacted polyol curative agent, and thereafter processing the heat treated rubber composition by conventional thermoplastic techniques to form the shaped article. Shaped articles that can be made by the method include low permeability extruded hoses, low permeation shaft seals, and the like. Processing the heat treated rubber composition by thermoplastic techniques generally involves heating the rubber composition above its thermoplastic processing temperature for further use in extrusion, injection molding, and other thermoplastic processes.

Methods for making a shaped article comprising a cured fluorocarbon elastomer in a thermoplastic matrix involve a number of steps. First, an elastomer composition is combined with a non-curing thermoplastic polymer material. The elastomer composition comprises a fluorocarbon elastomer, and optionally further comprises a polyol curative agent and an accelerator. The combination is then melt blended. If not already contained in the elastomer composition, the curative agent and accelerator, as well as an acid acceptor and other additives are added to the melt blend. The melt blend comprising fluorocarbon elastomer, polyol curative agent, accelerator, and thermoplastic polymer material is heated while applying shear for a time and at a temperature sufficient to at least partially cure the fluorocarbon elastomer. The resulting dynamic vulcanizate is then cooled and converted into a particulate form. In a further step, the particulate dynamic vulcanizate is heat treated by exposing it to a temperature of about 150° C. or greater for a time sufficient to remove at least some of the excess polyol curative agent remaining in the dynamic vulcanizate after cure or partial cure. After at least some of the excess polyol curative has been removed by the preceding heat treatment step, the heat treated dynamic vulcanizate is heated above its processing temperature and processed according to thermoplastic techniques to make the shaped article.

In various embodiments, the heat treatment step is carried out at a temperature of above 150° C. but below its thermoplastic processing temperature. For simplicity, the heat treatment will be referred to as a pre-molding heat treatment, although it is to be understood that the heat treatment can in fact precede other thermoplastic techniques that are to be carried out on the dynamic vulcanizate. In addition to molding, such techniques can include extrusion and thermoforming. In a preferred embodiment, the pre-molding heat treatment is carried out at about 230° C. for a time exceeding one hour, preferably greater than five hours. In various embodiments, the heat treatment is carried out for a period of about 16 to 24 hours. When the dynamically cured vulcanizate contains a lesser amount of excess polyol curative agent, the pre-molding heat treatment may be carried out for shorter periods of time at temperatures toward the lower end of the preferred range. For example, heat treatment may be carried out at 200° C. or less for a time of 2 hours or less. In an exemplary embodiment, heat treatment is carried out at about 150° C.

In another embodiment, the invention provides a method of preparing a thermally processable rubber composition and for making shaped articles from the composition, which method may be carried out without a separate pre-molding heat treatment step as described above, or alternatively with a relatively short heat treatment of two hours or less at a relatively low temperature of 200° C. or less. In this embodiment, a cure-incorporated elastomer composition and a non-curing thermoplastic polymeric material are first melt blended. The melt blend is heated while applying shear for a time and at a temperature sufficient to cure the elastomer to a constant torque reading, and thereafter the melt blend is cooled to give a processable rubber composition. The elastomer composition contains a fluorocarbon elastomer, a phenol or polyol curative agent, and an accelerator, wherein the curative agent is present at a stoichiometric amount such that after cure the dynamic vulcanizate contains less than about 1 phr un-reacted phenol curative agent. In various embodiments, the dynamic vulcanizate has 0.5 phr or less, 0.2 phr or less, and preferably 0.1 phr or less of unreacted polyol curing agent after cure, where phr represents one part per hundred parts of elastomer. In a preferred embodiment, the phenol or polyol curative agent and the accelerator are finely dispersed in the elastomer composition, and the elastomer composition itself has suitable low viscosity to enhance mixing during dynamic vulcanization. In a preferred embodiment, the accelerator also has a suitably low viscosity. The combination of the fine dispersion of the phenol and accelerator in the elastomer together with the low mixing viscosities of components of the elastomer composition provides sufficient reaction kinetics to complete the cure of the fluorocarbon elastomer to a constant torque reading during the dynamic vulcanization step in 15 minutes or less at 180° C., and to provide development of a final cure density in 2 hours or less of pre-molding heat treatment at a temperature of 200° C. or less. The final cure density is marked by achieving a constant value of at least one of compression set, tensile strength, and elongation at break. It has been found that if the methods of the invention are carried out under these conditions, a separate pre-molding heat treatment step may be omitted, or the heat treatment can be carried out for a short period of time of about 2 hours or less at 230° C. or less, preferably about 200° C. or less, to obtain shaped articles with acceptable properties such as compression set and vapor permeability. Commercially available cure-incorporated elastomer compositions especially suited for this embodiment include Tecnoflon FOR 50HS and Tecnoflon FOR 80HS, produced by Solvay.

In a preferred embodiment, low permeability hoses such as those suitable as fuel hoses are prepared from the processable rubber compositions of the invention. A dynamic vulcanizate of a fluorocarbon elastomer in a thermoplastic matrix is optionally heat treated to remove excess polyol curing agent. Then the heat treated dynamic vulcanizate is made into a low permeability hose, for example by extrusion or co-extrusion. In a preferred embodiment, the processable rubber composition of the invention forms a gas impermeable inside layer of the hose, while a less expensive material, such as EPDM, butyl rubber, isoprene rubber, butylene rubber, butadiene rubber, AEM, ACM, nylon, thermoplastic elastomers, and the like forms the outside layer. Multilayer hoses can be prepared by extrusion of the processable rubber composition together with the less expensive material through a multilayer co-extrusion die. Alternatively, a tube or hose of the processable rubber composition can be first extruded and then fed into a rubber extruder to provide an extrusion coating comprising a thick layer of conventional rubber. Advantageously, the processable rubber composition forming the inner layer of the hose provides chemical resistance and low gas permeability, while the outer rubber layer provides flexibility, toughness, and structural integrity. A cost advantage is also obtained by use of a relatively less expensive material to provide the outer layer.

In another embodiment, the invention provides a low gas permeability hose comprising an extruded dynamic vulcanizate, wherein the vulcanizate comprises particles of cured fluorocarbon elastomer in a continuous phase of a thermoplastic polymeric material, and the hose has a vapor permeation rate of less than about 8 grams per square meter per day, preferably less than 7 grams per square meter per day, preferably less than or equal to about 5 grams per square meter per day, and more preferably less than or equal about 3 grams per square meter per day, as measured according to standard test method ASTM D-814 using fuel C. The hoses of the invention optionally further comprise an extrusion layer on the extruded dynamic vulcanizate that forms an outer layer of the hose. The extrusion layer comprises a non-fluorocarbon rubber, a thermoplastic material, or a thermoplastic elastomer.

If desired, an adhesive layer may be provided to aid in bonding of the processable rubber composition with the outer layer of the hose. In an alternative embodiment where the outer layer is made of a thermoplastic material such as nylon or a thermoplastic elastomer, specialized adhesives may be used. In a non-limiting example, a functionalized ethylene/trifluoroethylene copolymer such as Tefzel®, sold by Dupont, is used to bond to nylons. To bond the processable rubber composition to other rubbers, the extruded dynamic vulcanizate can be surface treated by corona or plasma treatment before the extrusion coating is applied. Alternatively, the surface of the extruded dynamic vulcanizate can be chemically etched according to known procedures such as treatment with strong bases like sodium amine or sodium naphthalene. The etched surface is then neutralized before the extrusion coating is applied.

Fluorocarbon elastomers are curable compositions based on fluorine-containing polymers. Various types of fluoroelastomers may be used. One classification of fluoroelastomers is given in ASTM-D 1418, "Standard practice for rubber and rubber latices-nomenclature". The designation FKM is given for fluoro-rubbers that utilize vinylidene fluoride as a co-monomer. Several varieties of FKM fluoroelastomers are commercially available. A first variety may be chemically described as a copolymer of hexafluoropropylene and vinylidene fluoride. These FKM elastomers tend to have an advantageous combination of overall properties. Some commercial embodiments are available with about 66% by weight fluorine. Another type of FKM elastomer may be chemically described as a terpolymer of tetrafluoroethylene, hexafluoropropylene, and vinylidene fluoride. Such elastomers tend to have high heat resistance and good resistance to aromatic solvents. They are commercially available with, for example 68-69.5% by weight fluorine. Another FKM elastomer is chemically described as a terpolymer of tetrafluoroethylene, a fluorinated vinyl ether, and vinylidene fluoride. Such elastomers tend to have improved low temperature performance. They are available with 62-68% by weight fluorine. A fourth type of FKM elastomer is described as a terpolymer of tetrafluoroethylene, propylene, and vinylidene fluoride. Such FKM elastomers tend to have improved base resistance. Some commercial embodiments contain about 67% weight fluorine. A fifth type of FKM elastomer may be described as a pentapolymer of tetrafluoroethylene, hexafluoropropylene, ethylene, a fluorinated vinyl ether and vinylidene fluoride. Such elastomers typically have improved base resistance and have improved low temperature performance.

Another category of fluorocarbon elastomers is designated as FFKM. These elastomers may be designated as perfluoroelastomers because the polymers are completely fluorinated and contain no carbon hydrogen bond. As a group, the FFKM fluoroelastomers tend to have superior fluid resistance. They were originally introduced by DuPont under the Kalrez® trade name. Additional suppliers include Daikin and Ausimont.

A third category of fluorocarbon elastomer is designated as FTPM. Typical of this category are the copolymers of propylene and tetrafluoroethylene. The category is characterized by a high resistance to basic materials such as amines.

Preferred fluorocarbon elastomers include commercially available copolymers of one or more fluorine containing monomers, chiefly vinylidene fluoride (VDF), hexafluoropropylene (HFP), tetrafluoroethylene (TFE), and perfluorovinyl ethers (PFVE). Preferred PFVE include those with a C1-8 perfluoroalkyl group, preferably perfluoroalkyl groups with 1 to 6 carbons, and particularly perfluoromethyl vinyl ether and perfluoropropyl vinyl ether. In addition, the copolymers may also contain repeating units derived from olefins such as ethylene (Et) and propylene (Pr). Preferred copolymer fluorocarbon elastomers include VDF/HFP, VDF/HFP/TFE, TFE/Pr, and TFE/Pr/VDF. The elastomer designation gives the monomers from which the elastomer gums are synthesized. In various embodiments, the elastomer gums have viscosities that give a Mooney viscosity in the range generally of 15-160 (ML1+10, large rotor at 121° C.), which can be selected for a combination of flow and physical properties. Elastomer suppliers include Dyneon (3M), Asahi Glass Fluoropolymers, Solvay/Ausimont, Dupont, and Daikin.

In a preferred embodiment, the elastomeric material comprises repeating units derived from 10-90 mole % tetrafluoroethylene, 10-90 mole % C2-4 olefin, and up to 30 mole % of one or more additional fluorine-containing monomers. Preferably, the repeating units are derived from 25-90 mole % tetrafluoroethylene and 10-75 mole % C2-4 olefin. In another preferred embodiment, the repeating units are derived from 45-65 mole % tetrafluoroethylene and 20-55 mole % C2-4 olefin.

In various embodiments, the molar ratio of tetrafluoroethylene units to $C_{2-4}$ olefin repeating units is from 60:40 to 40:60. In another embodiment, the elastomeric material comprises alternating units of $C_{2-4}$ olefins and tetrafluoroethylene. In such polymers the molar ratio of tetrafluoroethylene to $C_{2-4}$ olefin is approximately 50:50.

In another embodiment, the elastomeric materials are provided as block copolymers having an A-B-A structure, wherein A represents a block of poly-tetrafluoroethylene and B represents a block of polyolefin.

A preferred $C_{2-4}$ olefin is propylene. Elastomeric materials based on copolymers of tetrafluoroethylene and propylene are commercially available, for example from Asahi under the Aflas® trade name.

A preferred additional monomer in the vulcanized elastomeric material is vinylidene difluoride. Other fluorine-containing monomers that may be used in the elastomeric materials of the invention include without limitation, perfluoroalkyl vinyl compounds, perfluoroalkyl vinylidene compounds, and perfluoroalkoxy vinyl compounds. Hexafluoropropylene (HFP) is an example of perfluoroalkyl vinyl monomer. Perfluoromethyl vinyl ether is an example of a preferred perfluoroalkoxy vinyl monomer. For example, rubbers based on copolymers of tetrafluoroethylene, ethylene, and perfluoromethyl vinyl ether are commercially available from Dupont under the Viton® ETP trade name.

In another embodiment, the elastomeric materials are curable fluorocarbon elastomers containing repeating units derived from fluoromonomers vinylidene fluoride (VDF) and hexafluoropropylene (HFP). In some embodiments, the elastomers further contain repeating units derived from tetrafluoroethylene.

Chemically, in this embodiment the elastomeric material is made of copolymers of VDF and HFP, or of terpolymers of VDF, HFP, and tetrafluoroethylene (TFE), with optional cure site monomers. In preferred embodiments, they contain about 66 to about 70% by weight fluorine. The elastomers are commercially available, and are exemplified by the Viton® A, Viton® B, and Viton® F series of elastomers from DuPont Dow Elastomers. Grades are commercially available containing the gum polymers alone, or as curative-containing precompounds.

In another embodiment, the elastomers can be described chemically as copolymers of TFE and PFVE, optionally as a terpolymer with VDF. The elastomer may further contain repeating units derived from cure site monomers.

Fluorocarbon elastomeric materials used to make the processable rubber compositions of the invention may typically be prepared by free radical emulsion polymerization of a monomer mixture containing the desired molar ratios of starting monomers. Initiators are typically organic or inorganic peroxide compounds, and the emulsifying agent is typically a fluorinated acid soap. The molecular weight of the polymer formed may be controlled by the relative amounts of initiators used compared to the monomer level and the choice of transfer agent if any. Typical transfer agents include carbon tetrachloride, methanol, and acetone. The emulsion polymerization may be conducted under batch or continuous conditions. Such fluoroelastomers are commercially available as noted above.

In some embodiments, the thermoplastic material comprises at least one fluorine containing thermoplastic polymer, or fluoroplastic. Thermoplastic fluorine-containing polymers may be selected from a wide range of polymers and commercial products. The polymers are melt processable—they soften and flow when heated, and can be readily processed in thermoplastic techniques such as injection molding, extrusion, compression molding, and blow molding. The materials are readily recyclable by melting and re-processing.

The thermoplastic polymers may be fully fluorinated or partially fluorinated. Fully fluorinated thermoplastic polymers include copolymers of tetrafluoroethylene and perfluoroalkyl vinyl ethers. The perfluoroalkyl group is preferably of 1 to 6 carbon atoms. Examples of copolymers are PFA (copolymer of TFE and perfluoropropyl vinyl ether) and MFA (copolymer of TFE and perfluoromethyl vinyl ether). Other examples of fully fluorinated thermoplastic polymers include copolymers of TFE with perfluoro olefins of 3 to 8 carbon atoms. Non-limiting examples include FEP (copolymer of TFE and hexafluoropropylene).

Partially fluorinated thermoplastic polymers include E-TFE (copolymer of ethylene and TFE), E-CTFE (copolymer of ethylene and chlorotrifluoroethylene), and PVDF (polyvinylidene fluoride). A number of thermoplastic copolymers of vinylidene fluoride are also suitable thermoplastic polymers for use in the invention. These include, without limitation, copolymers with perfluoroolefins such as hexafluoropropylene, and copolymers with chlorotrifluoroethylene. Thermoplastic terpolymers may also be used. These include thermoplastic terpolymers of TFE, HFP, and vinylidene fluoride. Commercial embodiments are available which contain 59 to 76% by weight fluorine. An example is Dyneon THV, which exhibits a melting point of from about 120° C. to about 200° C., depending on the composition. In one embodiment, partially fluorinated fluoroplastics are preferred that are characterized by a melting point of from about 105° C. to about 160° C. Use of these rather low melting fluoroplastics permits the use of peroxide curing agents at a low temperature where undesirable volatilization of the peroxides is minimized.

Non-fluorine containing thermoplastic polymers may also be used. In one aspect, a thermoplastic material is one the melt viscosity of which can be measured, such as by ASTM D-1238 or D-2116, at a temperature above its melting point The thermoplastic material of the invention may be selected to provide enhanced properties of the rubber/thermoplastic combination at elevated temperatures, preferably above 100° C. and more preferably at about 150° C. and higher. Such thermoplastics include those that maintain physical properties, such as at least one of tensile strength, modulus, and elongation at break to an acceptable degree at the elevated temperature. In a preferred embodiment, the thermoplastics possess physical properties at the elevated temperatures that are superior (i.e. higher tensile strength, higher modulus, and/or higher elongation at break) to those of the cured fluorocarbon elastomer (rubber) at a comparable temperature.

The thermoplastic polymeric material used in the invention may be a thermoplastic elastomer. Thermoplastic elastomers have some physical properties of rubber, such as softness, flexibility and resilience, but may be processed like thermoplastics. A transition from a melt to a solid rubber-like composition occurs fairly rapidly upon cooling. This is in contrast to conventional elastomers, which harden slowly upon heating. Thermoplastic elastomers may be processed on conventional plastic equipment such as injection molders and extruders. Scrap may generally be readily recycled.

Thermoplastic elastomers have a multi-phase structure, wherein the phases are generally intimately mixed. In many cases, the phases are held together by graft or block copolymerization. At least one phase is made of a material that is hard at room temperature but fluid upon heating. Another phase is a softer material that is rubber like at room temperature.

Some thermoplastic elastomers have an A-B-A block copolymer structure, where A represents hard segments and B is a soft segment. Because most polymeric material tend to be incompatible with one another, the hard and soft segments of thermoplastic elastomers tend to associate with one another to form hard and soft phases. For example, the hard segments tend to form spherical regions or domains dispersed in a continuous elastomer phase. At room temperature, the domains are hard and act as physical crosslinks tying together elastomeric chains in a 3-D network. The domains tend to lose strength when the material is heated or dissolved in a solvent.

Other thermoplastic elastomers have a repeating structure represented by $(A-B)_n$, where A represents the hard segments and B the soft segments as described above, and n indicates a number of repeating units.

Many thermoplastic elastomers are known. Non-limiting examples of A-B-A type thermoplastic elastomers include polystyrene/polysiloxane/polystyrene, polystyrene/polyethylene-co-butylene/polystyrene, polystyrene/polybutadiene polystyrene, polystyrene/polyisoprene/polystyrene, poly-α-methyl styrene/polybutadiene/poly-α-methyl styrene, poly-α-methyl styrene/polyisoprene/poly-α-methyl styrene, and polyethylene/polyethylene-co-butylene/polyethylene.

Non-limiting examples of thermoplastic elastomers having a (A-B)n repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Among the most common commercially available thermoplastic elastomers are those that contain polystyrene as the hard segment. Triblock elastomers are available with polystyrene as the hard segment and either polybutadiene, polyisoprene, or polyethylene-co-butylene as the soft segment. Similarly, styrene butadiene repeating co-polymers are commercially available, as well as polystyrene/polyisoprene repeating polymers.

A thermoplastic elastomer may have alternating blocks of polyamide and polyether. Such materials are commercially available, for example from Atofina under the Pebax® trade name. The polyamide blocks may be derived from a copolymer of a diacid component and a diamine component, or may be prepared by homopolymerization of a cyclic lactam. The polyether block is generally derived from homo- or copolymers of cyclic ethers such as ethylene oxide, propylene oxide, and tetrahydrofuran.

The thermoplastic polymeric material may also be selected from among solid, generally high molecular weight, plastic materials. Preferably, the materials are crystalline or semicrystalline polymers, and more preferably have a crystallinity of at least 25 percent as measured by differential scanning calorimetry. Amorphous polymers with a suitably high glass transition temperature are also acceptable as the thermoplastic polymeric material. The thermoplastic also preferably has a melt temperature or glass transition temperature in the range from about 80° C. to about 350° C., but the melt temperature should generally be lower than the decomposition temperature of the thermoplastic vulcanizate.

Non-limiting examples of thermoplastic polymers include polyolefins, polyesters, nylons, polycarbonates, styrene-acrylonitrile copolymers, polyethylene terephthalate, polybutylene terephthalate, polyamides, polystyrene, polystyrene derivatives, polyphenylene oxide, polyoxymethylene, and fluorine-containing thermoplastics.

Polyolefins are formed by polymerizing α-olefins such as, but not limited to, ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers, and blends of them, may be incorporated as the thermoplastic polymeric material of the invention.

Polyester thermoplastics contain repeating ester linking units in the polymer backbone. In one embodiment, they contain repeating units derived from low molecular weight diols and low molecular weight aromatic diacids. Non-limiting examples include the commercially available grades of polyethylene terephthalate and polybutylene terephthalate. Alternatively, the polyesters may be based on aliphatic diols and aliphatic diacids. Exemplary here the copolymers of ethylene glycol or butanediol with adipic acid. In another embodiment, the thermoplastic polyesters are polylactones, prepared by polymerizing a monomer containing both hydroxyl and carboxyl functionality. Polycaprolactone is a non-limiting example of this class of thermoplastic polyester.

Polyamide thermoplastics contain repeating amide linkages in the polymer backbone. In one embodiment, the polyamides contain repeating units derived from diamine and diacid monomers such as the well known nylon 66, a polymer of hexamethylene diamine and adipic acid. Other nylons have structures resulting from varying the size of the diamine and diacid components. Non-limiting examples include nylon 610, nylon 612, nylon 46, and nylon 6/66 copolymer. In another embodiment, the polyamides have a structure resulting from polymerizing a monomer with both amine and carboxyl functionality. Non-limiting examples include nylon 6 (polycaprolactam), nylon 11, and nylon 12.

Other polyamides made from diamine and diacid components include the high temperature aromatic polyamides containing repeating units derived from diamines and aromatic diacids such as terephthalic acid. Commercially available examples of these include PA6T (a copolymer of hexanediamine and terephthalic acid), and PA9T (a copolymer of nonanediamine and terephthalic acid), sold by Kuraray under the Genestar tradename. For some applications, the melting point of some aromatic polyamides may be higher than optimum for thermoplastic processing. In such cases, the melting point may be lowered by preparing appropriate copolymers. In a non-limiting example, in the case of PA6T, which has a melting temperature of about 370° C., it is possible to in effect lower the melting point to below a moldable temperature of 320° C. by including an effective amount of a non-aromatic diacid such as adipic acid when making the polymer.

In another preferred embodiment, an aromatic polyamide is used based on a copolymer of an aromatic diacid such as terephthalic acid and a diamine containing greater than 6 carbon atoms, preferably containing 9 carbon atoms or more. The upper limit of the length of the carbon chain of the diamine is limited from a practical standpoint by the availability of suitable monomers for the polymer synthesis. As a rule, suitable diamines include those having from 7 to 20 carbon atoms, preferably in the range of 9 to 15 carbons, and more preferably in the range from 9 to 12 carbons. Preferred embodiments include C9, C10, and C11 diamine based aromatic polyamides. It is believed that such aromatic polyamides exhibit an increase level of solvent resistance based on the oleophilic nature of the carbon chain having greater than 6 carbons. If desired to reduce the melting point below a preferred molding temperature (typically 320° C. or lower), the aromatic polyamide based on diamines of greater than 6 carbons may contain an effective amount of a non-aromatic diacid, as discussed above with the aromatic polyamide based on a 6 carbon diamine. Such effective amount of diacid should be enough to lower the melting point into a desired molding temperature range, without unacceptably affecting the desired solvent resistance properties.

Other non-limiting examples of high temperature thermoplastics include polyphenylene sulfide, liquid crystal polymers, and high temperature polyimides. Liquid crystal polymers are based chemically on linear polymers containing repeating linear aromatic rings. Because of the aromatic structure, the materials form domains in the nematic melt state with a characteristic spacing detectable by x-ray diffraction methods. Examples of materials include copolymers of hydroxybenzoic acid, or copolymers of ethylene glycol and linear aromatic diesters such as terephthalic acid or naphthalene dicarboxylic acid.

High temperature thermoplastic polyimides include the polymeric reaction products of aromatic dianhydrides and aromatic diamines. They are commercially available from a number of sources. Exemplary is a copolymer of 1,4-benzenediamine and 1,2,4,5-benzenetetracarboxylic acid dianhydride.

The curative agents and curative systems for the fluorocarbon elastomers used in the present invention are generally selected from the group of polyol and onium salt combinations. The polyol curative agents include phenol curative agents, while the onium salts are used as accelerators in the curing systems.

Suitable onium salts are described, for example, in U.S. Pat. Nos. 4,233,421; 4,912,171; and 5,262,490, each of which is incorporated by reference. Examples include triphenylbenzyl phosphonium chloride, tributyl alkyl phosphonium chloride, tributyl benzyl ammonium chloride, tetrabutyl ammonium bromide, and triarylsulfonium chloride.

Another class of useful onium salts is represented by the following formula:

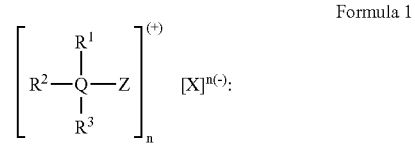

Formula 1 wherein

Q is nitrogen or phosphorus;

Z is a hydrogen atom or is a substituted or unsubstituted, cyclic or acyclic alkyl group having from 4 to about 20 carbon atoms that is terminated with a group of the formula —COOA where A is a hydrogen atom or a $NH_4^+$ cation or Z is a group of the formula —CY2 COOR' where Y is a hydrogen or halogen atom, or is a substituted or unsubstituted alkyl or aryl group having from 1 to about 6 carbon atoms that may optionally contain one or more quaternary heteroatoms and where R' is a hydrogen atom, a $NH_4^+$ cation, an alkyl group, or is an acyclic anhydride, e.g., a group of the formula —COR where R is an alkyl group or is a group that itself contains organo-onium (i.e., giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$ cation;

R1, R2, and R3 are each, independently, a hydrogen atom or an alkyl, aryl, alkenyl, or any combination thereof, each R1, R2, and R3 can be substituted with chlorine, fluorine, bromine, cyano, —OR", or —COOR" where R" is a C1 to C20 alkyl, aryl, aralkyl, or alkenyl, and any pair of the R1, R2, and R.3 groups can be connected with each other and with Q to form a heterocyclic ring; one or more of the R1, R2, and R3 groups may also be a group of the formula Z where Z is as defined above;

X is an organic or inorganic anion (for example, without limitation, halide, sulfate, acetate, phosphate, phosphonate, hydroxide, alkoxide, phenoxide, or bisphenoxide); and n is a number equal to the valence of the anion X.

The polyol crosslinking agents may be any of those polyhydroxy compounds known in the art to function as a crosslinking agent or co-curative for fluoroelastomers, such as those polyhydroxy compounds disclosed in U.S. Pat. No. 4,259,463 (Moggi et al.), U.S. Pat. No. 3,876,654 (Pattison), U.S. Pat. No. 4,233,421 (Worm), and U.S. Defensive Publication T107,801 (Nersasian). Preferred polyols include aromatic polyhydroxy compounds, aliphatic polyhydroxy compounds, and phenol resins.

Representative aromatic polyhydroxy compounds include any one of the following: di-, tri-, and tetrahydroxybenzenes, -naphthalenes, and -anthracenes, and bisphenols of the Formula

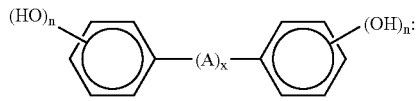

Formula 2 wherein A is a difunctional aliphatic, cycloaliphatic, or aromatic radical of 1 to 13 carbon atoms, or a thio, oxy, carbonyl, or sulfonyl radical, A is optionally substituted with at least one chlorine or fluorine atom, x is 0 or 1, each n is independently 1 or 2, and any aromatic ring of the polyhydroxy compound is optionally substituted with at least one atom of chlorine, fluorine, or bromine atom, or carboxyl or an acyl radical (e.g., —COR, where R is H or a C1 to C8 alkyl, aryl or cycloalkyl group) or alkyl radical with, for example, 1 to 8 carbon atoms. It will be understood from the above bisphenol formula III that the —OH groups can be attached in any position (other than number one) in either ring. Blends of two or more such compounds can also be used. A preferred bisphenol compound is Bisphenol AF, which is 2,2-bis(4-hydroxyphenyl)hexafluoropropane. Other non-limiting examples include 4,4'-dihydroxydiphenyl sulfone (Bisphenol S) and 2,2-bis(4-hydroxyphenyl) propane (Bisphenol A). Aromatic polyhydroxy compound, such as hydroquinone may also be used as curative agents. Further non-limiting examples include catechol, resorcinol, 2-methyl resorcinol, 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene.

Aliphatic polyhydroxy compounds may also be used as a polyol curative. Examples include fluoroaliphatic diols, e.g. 1,1,6,6-tetrahydrooctafluorohexanediol, and others such as those described in U.S. Pat. No. 4,358,559 (Holcomb et al.) and references cited therein. Derivatives of polyhydroxy compounds can also be used such as those described in U.S. Pat. No. 4,446,270 (Guenthner et al.) and include, for example, 2-(4-allyloxyphenyl)-2-(4-hydroxyphenyl)propane. Mixtures of two or more of the polyhydroxy compounds can be used.

Phenol resins capable of crosslinking a rubber polymer can be employed as the polyol curative agent. Reference to phenol resin may include mixtures of these resins. U.S. Pat. Nos. 2,972,600 and 3,287,440 are incorporated herein in this regard. These phenolic resins can be used to obtain the desired level of cure without the use of other curatives or curing agents.

Phenol resin curatives can be made by the condensation of alkyl substituted phenols or unsubstituted phenols with aldehydes, preferably formaldehydes, in an alkaline medium or by condensation of bi-functional phenol dialcohols. The alkyl substituents of the alkyl substituted phenols typically contain 1 to about 10 carbon atoms. Dimethylolphenols or phenolic resins, substituted in para-positions with alkyl groups containing 1 to about 10 carbon atoms, are preferred. Useful commercially available phenol resins include alkylphenol-formaldehyde resin, and bromomethylated alkylphenol-formaldehyde resins.

In one embodiment, phenol resin curative agents may be represented by the general formula:

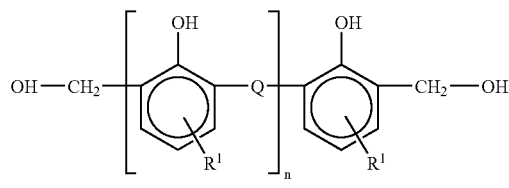

where Q is a divalent radical selected from the group consisting of —CH2- and —CH2-O—CH2-; m is zero or a positive integer from 1 to 20 and R' is hydrogen or an organic radical. Preferably, Q is the divalent radical —CH2-O—CH2-, m is zero or a positive integer from 1 to 10, and R' is hydrogen or an organic radical having less than 20 carbon atoms. In another embodiment, preferably m is zero or a positive integer from 1 to 5 and R' is an organic radical having between 4 and 12 carbon atoms. Other preferred phenol resins are also defined in U.S. Pat. No. 5,952,425, which is incorporated herein by reference.

The cured fluorocarbon elastomer compositions of the invention are prepared by a process of dynamic vulcanization. Dynamic vulcanization is a vulcanization or curing process for a rubber (here a fluorocarbon elastomer) contained in a thermoplastic composition, wherein the curable rubber is vulcanized under conditions of sufficiently high shear at a temperature above the melting point of the thermoplastic component. In this way, the rubber is simultaneously crosslinked and dispersed within the thermoplastic matrix. Dynamic vulcanization may be carried out by applying mechanical energy to mix the elastomeric and thermoplastic components at elevated temperature in the presence of a curative in conventional mixing equipment, such as roll mills, Moriyama mixers, Banbury mixers, Brabender mixers, continuous mixers, mixing extruders such as single and twin-screw extruders, and the like. An advantageous characteristic of dynamically cured compositions is that, not withstanding that the elastomeric component is fully cured, the composition can be processed and reprocessed by conventional plastic processing techniques such as extrusion, injection molding, and compression molding. Scrap or flashing can also be salvaged and reprocessed with thermoplastic techniques.

The vulcanized elastomeric material that results from the process of dynamic vulcanization is generally present as small particles within a continuous thermoplastic polymer matrix. A co-continuous morphology is also possible depending on the amount of elastomeric material relative to thermoplastic material, the cure system, the mechanism of cure and the amount and degree of mixing.

After dynamic vulcanization, a homogeneous mixture is obtained wherein the cured fluoroelastomer is in the form of dispersed particles having an average particle smaller than about 50 micrometers, preferably of an average particle size smaller than about 25 micrometers. The particle size may be determined from maps prepared by atomic force microscopy on cryogenically microtomed cross-sections of shaped articles formed from the processable rubber composition.

Typically, the particles have an average size of 10 micrometers or less, more preferably 5 micrometers or less as measured with the atomic force microscopy technique. In some embodiments, the particles have an average size of 1 micrometer or less. In other embodiments, even when the average particle size is higher, there will be a significant number of cured elastomer particles with a diameter of less than 1 micron dispersed in the thermoplastic matrix.

In a preferred embodiment, plasticizers, extender oils, synthetic processing oils, or a combination thereof may be used in the compositions of the invention. The type of processing oil selected will typically be consistent with that ordinarily used in conjunction with the specific rubber or rubbers present in the composition. The extender oils may include, but are not limited to, aromatic, naphthenic, and paraffinic extender oils. Preferred synthetic processing oils include polylinear α-olefins. The extender oils may also include organic esters, alkyl ethers, or combinations thereof. As disclosed in U.S. Pat. No. 5,397,832, it has been found that the addition of certain low to medium molecular weight organic esters and alkyl ether esters to the compositions of the invention lowers the Tg of the thermoplastic and rubber components, and of the overall composition, and improves the low temperatures properties, particularly flexibility and strength. These organic esters and alkyl ether esters generally have a molecular weight that is generally less than about 10,000. Particularly suitable esters include monomeric and oligomeric materials having an average molecular weight below about 2000, and preferably below about 600. In one embodiment, the esters may be either aliphatic mono- or diesters or alternatively oligomeric aliphatic esters or alkyl ether esters.

In addition to the elastomeric material, the thermoplastic polymeric material, and curative, the processable rubber compositions of this invention may include other additives such as stabilizers processing aids, curing accelerators, fillers, pigments, adhesives, tackifiers, and waxes. The properties of the compositions and articles of the invention may be modified, either before or after vulcanization, by the addition of ingredients that are conventional in the compounding of rubber, thermoplastics, and blends thereof.

A wide variety of processing aids may be used, including plasticizers and mold release agents. Non-limiting examples of processing aids include Caranuba wax, phthalate ester plasticizers such as dioctylphthalate (DOP) and dibutylphthalate silicate (DBS), fatty acid salts such zinc stearate and sodium stearate, polyethylene wax, and keramide. In some embodiments, high temperature processing aids are preferred. Such include, without limitation, linear fatty alcohols such as blends of C10-C28 alcohols, organosilicones, and functionalized perfluoropolyethers. In some embodiments, the compositions contain about 1 to about 15% by weight processing aids, preferably about 5 to about 10% by weight.

Acid acceptor compounds are commonly used to speed up or stabilize the cure of the fluorocarbon elastomers. Preferred acid acceptor compounds include oxides and hydroxides of divalent metals. Non-limiting examples include $Ca(OH)_2$, MgO, CaO, and ZnO.

Non-limiting examples of fillers include both organic and inorganic fillers such as, barium sulfate, zinc sulfide, carbon black, silica, titanium dioxide, clay, talc, fiber glass, fumed silica and discontinuous fibers such as mineral fibers, wood cellulose fibers, carbon fiber, boron fiber, and aramid fiber (Kevlar). Some non-limiting examples of processing additives include stearic acid and lauric acid. The addition of carbon black, extender oil, or both, preferably prior to dynamic vulcanization, is particularly preferred. Non-limiting examples of carbon black fillers include SAF black, HAF black, SRP black and Austin black. Carbon black improves the tensile strength, and an extender oil can improve processability, the resistance to oil swell, heat stability, hysteresis, cost, and permanent set. In a preferred embodiment, fillers such as carbon block may make up to about 40% by weight of the total weight of the compositions of the invention. Preferably, the compositions comprise 1 to 40 weight % of filler. In other embodiments, the filler makes up 10 to 25 weight % of the compositions.

The size of the particles referred to above may be equated to the diameter of spherical particles, or to the diameter of a sphere of equivalent volume. It is to be understood that not all particles will be spherical. Some particles will be fairly isotropic so that a size approximating a sphere diameter may be readily determined. Other particles may be anisotropic in that one or two dimensions may be longer than another dimension. In such cases, the preferred particle sizes referred to above correspond to the shortest of the dimensions of the particles.

In some embodiments, the cured elastomeric material is in the form of particles forming a dispersed, discrete, or non-continuous phase wherein the particles are separated from one another by the continuous phase made up of the thermoplastic matrix. Such structures are expected to be more favored at relatively lower loadings of cured elastomer, i.e. where the thermoplastic material takes up a relatively higher volume of the compositions. In other embodiments, the cured material may be in the form of a co-continuous phase with the thermoplastic material. Such structures are believed to be favored at relatively higher volume of the cured elastomer. At intermediate elastomer loadings, the structure of the two-phase compositions may take on an intermediate state in that some of the cured elastomer may be in the form of discrete particles and some may be in the form of a co-continuous phase.

The homogenous nature of the compositions, the small particle size indicative of a large surface area of contact between the phases, and the ability of the compositions to be formed into shaped articles having sufficient hardness, tensile strength, modulus, elongation at break, or compression set to be useful in industrial applications, indicate a relatively high degree of compatibility between the elastomer and thermoplastic phases.

The progress of the vulcanization may be followed by monitoring mixing torque or mixing energy requirements during mixing. The mixing torque or mixing energy curve generally goes through a maximum after which mixing can be continued somewhat longer to improve the fabricability of the blend. If desired, one can add additional ingredients, such as the stabilizer package, after the dynamic vulcanization is complete. The stabilizer package is preferably added to the thermoplastic vulcanizate after vulcanization has been essentially completed, i.e., the curative has been essentially consumed.

The processable rubber compositions of the invention may be manufactured in a batch process or a continuous process.

In a batch process, predetermined charges of elastomeric material, thermoplastic, and curative agents are added to a mixing apparatus. In a typical batch procedure, the elastomeric material and thermoplastic are first mixed, blended, masticated or otherwise physically combined until a desired particle size of elastomeric material is provided in a continuous phase of thermoplastic material. When the structure of the elastomeric material is as desired, a curative agent may be added while continuing to apply mechanical energy to mix the elastomeric material and thermoplastic. Curing is effected by heating or continuing to heat the mixing combination of thermoplastic and elastomeric material in the presence of the curative agent. When cure is complete, the processable rubber composition may be removed from the reaction vessel (mixing chamber) for further processing.

It is preferred to mix the elastomeric material and thermoplastic at a temperature where the thermoplastic material softens and flows. If such a temperature is below that at which the curative agent is activated, the curative agent may be a part of the mixture during the initial particle dispersion step of the batch process. In some embodiments, a curative is combined with the elastomeric material and thermoplastic at a temperature below the curing temperature. When the desired dispersion is achieved, the temperature may be increased to effect cure. In one embodiment, commercially available elastomeric materials are used that contain a curative pre-formulated into the elastomer. However, if the curative agent is activated at the temperature of initial mixing, it is preferred to leave out the curative until the desired particle size distribution of the elastomeric material in the thermoplastic matrix is achieved. In another embodiment, curative is added after the elastomeric material and thermoplastic are mixed. In a preferred embodiment, the curative agent is added to a mixture of elastomeric particles in the thermoplastic while the entire mixture continues to be mechanically stirred, agitated or otherwise mixed.

Continuous processes may also be used to prepare the processable rubber compositions of the invention. In a preferred embodiment, a twin screw extruder apparatus, either co-rotation or counter-rotation screw type, is provided with ports for material addition and reaction chambers made up of modular components of the twin screw apparatus. In a typical continuous procedure, the thermoplastic and elastomeric materials are combined by inserting them into the screw extruder together from a first hopper using a feeder (loss-in-weight or volumetric feeder). Temperature and screw parameters may be adjusted to provide a proper temperature and shear to effect the desired mixing and particle size distribution of an uncured elastomeric component in a thermoplastic material matrix. The duration of mixing may be controlled by providing a longer or shorter length of extrusion apparatus or by controlling the speed of screw rotation for the mixture of elastomeric material and thermoplastic material to go through during the mixing phase. The degree of mixing may also be controlled by the mixing screw element configuration in the screw shaft, such as intensive, medium or mild screw designs. Then, at a downstream port, by using side feeder (loss-in-weight or volumetric feeder), the curative agent may be added continuously to the mixture of thermoplastic and elastomeric materials as it continues to travel down the twin screw extrusion pathway. Downstream of the curative additive port, the mixing parameters and transit time may be varied as described above. By adjusting the shear rate, temperature, duration of mixing, mixing screw element configuration, as well as the time of adding the curative agent, processable rubber compositions of the invention may be made in a continuous process. As in the batch process, the elastomeric material may be commercially formulated to contain a curative agent, generally a phenol or phenol resin curative.

The compositions and articles of the invention will contain a sufficient amount of vulcanized elastomeric material ("rubber") to form a rubbery composition of matter, that is, they will exhibit a desirable combination of flexibility, softness, and compression set. Preferably, the compositions should comprise at least about 25 parts by weight rubber, preferably at least about 35 parts by weight rubber, more preferably at least about 40 parts by weight rubber, even more preferably at least about 45 parts by weight rubber, and still more preferably at least about 50 parts by weight rubber per 100 parts by weight of the rubber and thermoplastic polymer combined. The amount of cured rubber within the thermoplastic vulcanizate is generally from about 5 to about 95 percent by weight, preferably from about 35 to about 95 percent by weight, more preferably from about 40 to about 90 weight percent, and more preferably from about 50 to about 80 percent by weight of the total weight of the rubber and the thermoplastic polymer combined.

The amount of thermoplastic material within the processable rubber compositions of the invention is generally from about 5 to about 95 percent by weight, preferably from about 10 to about 65 percent by weight and more preferably from about 20 to about 50 percent by weight of the total weight of the rubber and the fluoroplastic blend combined.

Advantageously, the shaped articles of the invention are rubber-like materials that, unlike conventional rubbers, can be processed and recycled like thermoplastic materials. These materials are rubber like to the extent that they will retract to less than 1.5 times their original length within one minute after being stretched at room temperature to twice its original length and held for one minute before release, as defined in ASTM D1566. Also, these materials satisfy the tensile set requirements set forth in ASTM D412, and they also satisfy the elastic requirements for compression set per ASTM D395.

In one embodiment, the dynamic vulcanizate after cure, preferably to a constant torque reading, contains excess amounts of polyol or phenol curative agent. It has been discovered that when dynamic vulcanizates containing excess polyol curative agent are processed at high temperatures such as at melt processing temperatures for thermoplastic techniques, shaped articles resulting from the process are characterized by a high degree of porosity. It is believed that the porosity is caused by the off gassing of volatile curing agent and decomposition products during the high temperature melt processing. Such off gassing and decomposition present a problem for dynamically cured vulcanizates having a continuous matrix of a thermoplastic material. Unlike cured rubber compositions, the thermoplastic matrix is subject to the formation of pores and voids by the action of the volatilizing decomposition products. Such processes lead to the formation of shaped articles having undesirable gas/vapor permeability characteristics. For applications such as hoses for fuel systems, the undesirable permeability properties render them unsuitable for their purpose.

To overcome the problem, the dynamic vulcanizate containing excess curative agent can be put through a heat treatment step to at least partially drive off or decompose the excess curative agent. As discussed above, the heat treatment is referred to herein as a pre-molding heat treatment, even though it is understood the treatment can precede other thermoplastic techniques such as extrusion, blowing, or thermoforming. As a result, shaped articles made by thermoplastic techniques from the processable rubber compositions are characterized by a lower degree of vapor permeability and are suitable for applications such as fuel hoses.

In various embodiments, the pre-molding heat treatment step is carried out on a dynamic vulcanizate in particulate form. The particles of the dynamic vulcanizate may be prepared by a number of methods. In one embodiment, the dynamic vulcanizate is extruded through strand dies, cooled in a water bath, and cut into pellets for later pre-molding heat treatment. In various embodiments, the molten dynamic vulcanizate is removed from the reaction chamber and ground or milled into particles of suitable size for subsequent pre-molding heat treatment.

The pre-molding heat treatment may be carried out immediately upon cooling and pelletizing of the dynamic vulcanizate, or the pellets may be stored for a short period or an extended period of time before the subsequent heat treatment and thermoplastic processing into shaped articles. Whenever the pre-molding heat treatment is to be carried out, it is preferred to heat the particulate dynamic vulcanizate at a sufficient temperature so that volatile curative agent will be driven off and/or the curative agent decomposed and the decomposition products driven off during the heat treatment. In a preferred embodiment, the heat treatment is carried out at a temperature of about 150° C. or greater. In various embodiments, it is preferred to carry out the pre-molding heat treatment at a temperature below which the dynamic vulcanizate being heat treated will soften and flow. For this reason, it is preferred to carry out the heat treatment at temperatures below the melt processing temperature of the pellets.

In one aspect, the nature of the thermoplastic continuous phase determines and limits the temperature at which the pre-molding heat treatment may be carried out. In preferred embodiments, the pre-molding heat treatment is carried out at temperatures as high as 230° C. or above. For these embodiments, it is preferred to use dynamic vulcanizates containing a thermoplastic continuous phase with a melting or a softening point above 230° C. Non-limiting examples of such suitable thermoplastics include fully fluorinated thermoplastics, as well as their blends with partially fluorinated thermoplastics. Typical melting points of fully fluorinated plastics include FPA at about 305° C. and FEP at about 290° C. It has also been found that blends of the fully fluorinated thermoplastics and a partially fluorinated thermoplastic may be used as long as an overall melting temperature of the thermoplastic blend and the dynamic vulcanizate remain above about 230° C.

Pre-molding heat treatment is carried out generally under ambient pressure conditions, but at elevated temperatures, preferably from about 150° C. to about 230° C. It is preferred to heat treat the particles at a temperature below which the particles would soften, flow, or coalesce. It is also preferred to tumble or gently agitate the particles during the heat treatment. In various embodiments, for example, where the fluorocarbon elastomer contains finely dispersed curative and accelerator and cures rapidly during dynamic vulcanization, heat treating is carried out at 200° C. or less for 5 hours or less, preferably for 2 hours or less. In some embodiments, heat treatment is carried out for about one hour. In an exemplary embodiment, heat treating is carried out at about 150° C. for 1 hour.

The pre-molding heat treatment is carried out for a time until at least some of the excess polyol or phenol curative agent is driven off or decomposed. The course of the heat treatment can be followed by observing visible smoke and other indications of volatile products being driven off. If desired, the course of the reaction can also be followed gravimetrically. Thus in various embodiments, the heat treatment is carried on for a time until visible smoke and the like are no longer observed, or for a time until a constant weight of the pellets is reached.

The pre-molding heat treatment is carried out in order to drive off excess curative agents, which would otherwise cause problems in subsequent thermoplastic processing due to volatization and pore formation in the thermoplastic matrix of the shaped article. As a result of using the method, it is possible to make shaped articles such as hoses and gaskets that have an acceptable level of gas and vapor permeability. However, another advantage observed is the development of some favorable properties during and as a result of the pre-molding heat treatment step.

As noted above, the dynamic vulcanizate is heated under shear for a time and at a temperature sufficient to at least partially cure the fluorocarbon elastomer. In some embodiments, the dynamic vulcanization is carried on for a time sufficient to completely cure the elastomer, as indicated by a constant torque on the mixing apparatus. Even when the dynamic vulcanization process results in a complete cure of the fluorocarbon elastomer as tested by constant torque however, the pre-molding heat treatment step can be observed to further develop desirable characteristics, such as compression set. For example, as shown in FIG. 1, the compression set of a shaped article (such as a gasket or seal) formed from heat treated dynamic vulcanizates decreases to a constant amount with increasing pre-molding heat treatment time.

The duration of pre-molding heat treatment needed to fully develop the property depends on the nature of the fluorocarbon elastomer and the curative agent, as well as the stoichiometric excess of curative agent used, the fineness of dispersion of the curative and accelerator in the elastomer, the effectiveness of the accelerator, the viscosity of the elastomer, and other parameters. FIG. 1 shows two curves indicating the development of compression set against time of pre-molding heat treatment. An experiment can be carried out wherein the cooled dynamic vulcanizate is subjected to heat treatment for a variable amount of time. After a time of heat treatment, the heat treated dynamic vulcanizate may be processed by thermoplastic techniques into shaped articles and the compression set measured. As shown in FIG. 1, a "fast curing" composition can develop its final compression set value within about 1 hour of pre-molding heat treatment, while a "slow curing" dynamic vulcanizate may develop a steady state compression set after several hours of heat treatment. As shown in FIG. 1, the slow curing composition develops a steady compression set after about 16 hours of pre-molding heat treatment 230° C. Thus, in addition to reducing the porosity of the shaped articles, the method provides a means for producing shaped articles having improved characteristics such as compression set. Figures analogous to FIG. 1 can also be prepared for other physical properties that reflect development of cure density, such as tensile strength and elongation at break.

The invention has been described above with regard to preferred embodiments. Further non-limiting disclosure of the invention is given in the Examples that follow.

EXAMPLES

The following materials are used in the Examples:

Fluorel FE 5840 is a high fluorine (70% F) cure incorporated fluoroelastomer from Dyneon.

Dyneon BRE 7231X is a base resistant cure incorporated fluoroelastomer from Dyneon. It is based on a terpolymer of TFE, propylene, and vinylidene fluoride.

Halar 500LC is a thermoplastic copolymer of ethylene and chlorotrifluoroethylene from Solvay.

Rhenofit CF is a calcium hydroxide from Rhein Chemie.

Elastomag 170 is a magnesium hydroxide powder from Rohm and Haas.

Struktol WS-280 is a processing aid from Struktol.

Austin Black is a carbon black filler.

Tecnoflon FPA-1 is a high temperature processing aid from Solvay.

MT Black is a carbon black filler.

Tecnoflon FOR 50HS and FOR 80HS are no (low) post cure bisphenol curable fluorocarbon elastomers from Solvay, with bisphenol curing agent formulated into the resin.

Dynamic vulcanizates are made by a batch procedure according to the recipes given in Examples 1-3. The elastomer and plastic materials are mixed together in a Brabender mixer at 50 rpm and 190° C. The acid acceptor and other materials are then added to start the cure. Mixing continues for about 10 minutes at 50 rpm and 190° C. until a steady state mixing torque is achieved. After cure of the fluorocarbon elastomer is complete, as indicated by constant torque reading on the mixer, the vulcanizate is cooled to room temperature and ground into particulate form.

Example 1

| Ingredient | Ex 1a Phr |
|---|---|
| Fluorel FE5840 | 70.0 |
| Dyneon BRE 7231X | 30.0 |
| Halar 500LC | 25.0 |
| Rhenofit CF | 6.0 |
| Elastomag 170 | 3.0 |
| Struktol WS-280 | 1.0 |
| Austin Black | 10.00 |
| Tecnoflon FPA-1 | 1.00 |

Example 2

| Ingredient | Ex 2a phr | Ex 2b phr | Ex 2c phr | Ex 2d phr | Ex 2e phr |
|---|---|---|---|---|---|
| Tecnoflon FOR 50HS | 100.0 | 100.0 | 100.0 | 100.0 | 100.0 |
| Halar 500LC | 25.0 | 50.0 | 100.0 | 150.0 | 200.0 |
| Elastomag 170 (MgO) | 3.0 | 3.0 | 3.0 | 3.0 | 3.0 |
| MT Black (N990) | 10.0 | 10.0 | 10.0 | 10.0 | 10.0 |
| Struktol WS-280 | 1.0 | 1.0 | 1.0 | 1.0 | 1.0 |
| Tecnoflon FPA-1 | 1.00 | 1.00 | 1.00 | 1.00 | 1.00 |

Example 3

| Ingredient | Ex 3a phr | Ex 3b phr | Ex 3c phr | Ex 3d phr | Ex 3e phr |
|---|---|---|---|---|---|
| Tecnoflon FOR 80HS | 100.0 | 100.0 | 100.0 | 100.0 | 100.0 |
| Halar 500LC | 25.0 | 50.0 | 100.0 | 150.0 | 200.0 |
| Elastomag 170 (MgO) | 3.0 | 3.0 | 3.0 | 3.0 | 3.0 |
| MT Black (N990) | 10.00 | 10.00 | 10.00 | 10.00 | 10.00 |
| Skruktol WS-280 | 1.00 | 1.00 | 2.00 | 1.00 | 1.00 |
| Tecnoflon FPA-1 | 1.0 | 1.0 | 1.0 | 1.0 | 1.0 |

Example 4

A fuel hose is extruded from the dynamic vulcanizate of Example 1. Hoses are produced by extruding through a thin wall (about 0.4 mm) or a thick wall (about 2 mm) extrusion die. The barrel and extrusion die are set at 230° C. to 250° C. A large amount of gas is generated during the extrusion process. A ventilation hole is required at the downstream section of the extruder barrel to release the gases given off. Extrusion of the fuel hose is not possible without ventilation. When the extrusion is carried out with a gas ventilation hole, the extruded hose exhibits porous holes that are connected to each other to provide a pathway for gases. As a result of the interconnected porous structure, the hose performs poorly in an air leak test.

Example 5

Pre-Molding Heat Treatment

The dynamic vulcanizate of Example 1 is heat treated in particulate form. The particles of the dynamic vulcanizate of Example 1 are exposed to a temperature of 230° C. for about 16 hours, with occasional agitation. Thereafter the heat treated particles are extruded into hoses as in Example 4. In contrast to the result in Example 4, in this example, with pre-molding heat treatment, no gas is observed given off during the extrusion process. Further, no ventilation hole is required. In contrast to the results of Example 4, the extruded hose exhibits acceptable fuel vapor permeability properties.

Example 6

The dynamic vulcanizates of Examples 2 and 3 are extruded into hoses as in Example 4, with either no pre-molding heat treatment (untreated), or with pre-molding heat treatment at 250° C. for one hour (treated), where "pre-molding" heat treatment refers to heat treatment performed after dynamic vulcanization but before extrusion. A hose extruded from the dynamic vulcanizate of Example 2 (untreated) gives a vapor permeation rate (vapor permeability) of 8 grams per square meter per day during exposure to fuel C at 40° C. for 30 days according to ASTM D-814. A hose extruded from the dynamic vulcanizate of Example 3 (untreated) exhibits a permeation rate of 7. Hoses extruded from heat treated samples of Examples 2 and 3 give a lowered vapor permeation rate of 3. Vapor permeation rate is measured according to ASTM D-814 using fuel C.

Example 7

A hose is extruded from the dynamic vulcanizate of Example 1. The particles of dynamic vulcanizate are either untreated (no pre-molding heat treatment) or treated (heated at 230° C. for 16 hours prior to extrusion). The vapor permeation rate of the hose extruded from untreated dynamic vulcanizate is 50 grams per square meter per day, while that of the treated hose is 3.

What is claimed is:

1. A method for processing a rubber composition comprising cured fluorocarbon elastomer, thermoplastic polymer material, and excess unreacted polyol curative agent into a shaped article, wherein the rubber composition is prepared by dynamically vulcanizing a fluorocarbon elastomer in the presence of a thermoplastic material and a polyol curative agent, and the curative agent is present in a stoichiometric amount to provide less than 1 phr of excess unreacted polyol after the dynamic vulcanization, the method comprising:
   after the dynamic vulcanizing, heat treating the rubber composition at a temperature of 150° C.-230° C.; and
   thereafter processing the heat treated dynamic vulcanizate by thermoplastic techniques to form the shaped article, wherein the rubber composition after dynamic vulcanizing comprises 1 phr or less of the unreacted polyol curative agent.

2. A method according to claim 1, comprising heat treating for less than 5 hours.

3. A method according to claim 1, comprising heat treating for one hour or less.

4. A method according to claim 1, comprising heat treating at 200° C. or less.

5. A method according to claim 4, comprising extruding the heat treated dynamic vulcanizate into a hose.

6. A method according to claim 1, wherein the thermoplastic polymeric material comprises a fluoroplastic.

7. A method according to claim 6, wherein the thermoplastic polymeric material comprises a fully fluorinated fluoroplastic.

8. A method according to claim 6, wherein the thermoplastic polymeric material comprises a partially fluorinated fluoroplastic.

9. A method according to claim 1, comprising cooling the dynamic vulcanizate and converting it to particulate form prior to heat treating.

10. A method according to claim 1, comprising dynamically vulcanizing the fluorocarbon elastomer in the presence of the thermoplastic material and polyol curative agent by heating a melt blend comprising the fluorocarbon elastomer, polyol curative agent, accelerator, and thermoplastic polymer material while applying shear for a time and at a temperature sufficient to cure the fluorocarbon elastomer, as determined by a constant mixing torque.

11. A method according to claim 10, wherein dynamic vulcanizing comprises forming the melt blend by melt blending a cure incorporated elastomer composition and a non-curing thermoplastic, wherein the cure incorporated elastomer composition comprises the fluorocarbon elastomer, polyol curative agent, and accelerator.

12. A method of making an impermeable fluorocarbon rubber hose suitable for use as a fuel hose, the method comprising
heating a melt blend of a cure incorporated fluorocarbon elastomer composition and a non-curing thermoplastic polymeric material while applying shear for a time and at a temperature sufficient to cure the elastomer to a constant torque reading;
cooling the resulting composition to provide a processable rubber composition;
carrying out a heat treatment of the processable composition at a temperature of 230° C. or less; and
extruding the heat treated processable composition into a hose,
wherein the cure incorporated elastomer contains a phenol curative present in a stoichiometric amount to provide less than 1 phr unreacted curative after cure of the elastomer, and the processable rubber composition comprises less than 1 phr of unreacted phenol curative before heat treatment.

13. A method according to claim 12, wherein the heat treatment is carried out at a temperature of 200° C. or less.

14. A method according to claim 12, wherein the processable rubber composition before heat treatment comprises 0.5 phr or less of unreacted phenol curative.

15. A method according to claim 12, wherein the processable rubber composition before heat treatment comprises 0.2 phr or less of unreacted phenol curative.

16. A method according to claim 12, wherein the processable rubber composition before heat treatment comprises 0.1 phr or less of unreacted phenol curative.

17. A method according to claim 12, comprising heat treating at a temperature from 150° C.-230° C.

18. A method according to claim 17, wherein heat treatment is for a time to fully develop compression set properties.

19. A method according to claim 12, comprising heat treating for 5 hours or less.

20. A method according to claim 12, comprising heat treating for 2 hours or less.

21. A method according to claim 12, wherein the thermoplastic polymer material is a fluoroplastic.

22. A method according to claim 21, wherein the fluoroplastic is a fully fluorinated fluoroplastic.

23. A method according to claim 21, wherein the fluoroplastic is a partially fluorinated fluoroplastic.

* * * * *